United States Patent [19]

Larsen

[11] Patent Number: 5,360,252

[45] Date of Patent: Nov. 1, 1994

[54] AIR SCOOP FOR SELECTIVELY INDUCING DRAG ON A VEHICLE

[76] Inventor: Richard C. Larsen, 1515 E. St. Patrick St. #240, Rapid City, S. Dak. 57701

[21] Appl. No.: 924,168

[22] Filed: Aug. 3, 1992

[51] Int. Cl.$^5$ .............................................. B62D 35/00
[52] U.S. Cl. ................................ 296/180.1; 296/180.5
[58] Field of Search ............... 296/180.1, 180.2, 180.3, 296/180.5

[56] References Cited

U.S. PATENT DOCUMENTS

| | | | |
|---|---|---|---|
| 3,328,074 | 6/1967 | Rossem | 296/180.1 |
| 3,524,672 | 8/1970 | Rawlings | 296/180.1 |
| 4,308,983 | 1/1982 | Yoshida | 296/180.5 X |
| 4,357,045 | 11/1982 | Kinford, Jr. | 296/180.2 |
| 4,693,506 | 9/1987 | Massengill | 296/180.3 |
| 4,824,165 | 4/1989 | Fry | 296/180.5 X |
| 5,092,648 | 3/1992 | Spears | 296/180.5 X |
| 5,129,699 | 7/1992 | De Angeli | 296/180.1 |

FOREIGN PATENT DOCUMENTS 1281065  11/1961  France ......................... 296/180.1

*Primary Examiner*—Joseph D. Pape

[57] ABSTRACT

An air scoop that is installed in certain type recreational vehicles, commercial buses, and commercial 5th wheel trailers for creating drag when activated. The basic construction is a rectangular box like structure having a slanted front with a controlled front panel. The controlled front panel, when activated, extends the forward edge thereof into the air stream passing by the vehicle while moving. This opening of the front of the retangular box like structure allows air to enter and the amount of air that enters depends on the amount of opening of the controlled panel and the speed of the vehicle. Air is guided into the unit allowing some of the air to escape through perforations in the back panel. The amount of drag created can be controlled by adjusting the front controlled panel opening amount. When the panel is closed the air scoop has no other function. If necessary, this invention is easily detached from the vehicle.

4 Claims, 2 Drawing Sheets

AIR SCOOP FOR SELECTIVELY INDUCING DRAG ON A VEHICLE

BACKGROUND OF THE INVENTION

1. Field of the Invention

This invention is unique in that it has limited application to certain type recreational vehicles, commercial buses and commercial 5th wheel trailers. This invention has no other function but to create drag when activated. The basic construction is a rectangular box like structure having a controlled front panel. The controlled front panel, when opened extends the forward edge thereof down/up into the air stream. Such opening of the front of the rectangular box like structure allows air to enter and the amount of air that enters depends on the amount that the controlled panel is opened and the speed of the vehicle. Air is not completely trapped inside the Air Scoop but escapes through the back panel thereof. The amount of drag created can be controlled by adjusting the front controlled panel opening amount. When the panel is closed the Air Scoop has no other function.

2. Description of Prior Art

Researching into the area of creating drag revealed little or no interest in it. What was found was a greater interest in reducing drag by various means. Drag as used in this invention is a new concept.

SUMMARY OF THE INVENTION

The main purpose of this invention is to provide an Air Scoop for inducing drag as desired. Under certain conditions there is a need to reduce excessive speed. The degree of effectiveness in reducing the forward speed is affected by the width, length, and depth of the Air Scoop plus the forward speed prior to actuation. The amount of drag can be controlled by the position of the controlled panel. The shape of the Air Scoop presents a basic streamline front causing some drag but not enough to outweigh the advantages of the Air Scoop. The weight of the Air Scoop should not be a problem since it is basically hollow. The simplicity of operation should enhance its reliability. The Air Scoop is simple to install and remove making it possible to use again on another vehicle of the same style thereby saving the cost of another unit. In the wet season, with proper judgement, and within certain speed ranges, the forward speed can be reduced improving a more timely application of the brakes. This invention does not replace the use of brakes or is it to be considered to be used in an emergency. This invention should be used in conjunction with brakes. Minor repair of a unit would be practical because of the simplicity of removal and reinstallation of a unit.

DESCRIPTION OF THE PREFERRED EMBODIMENT

Figure 1:
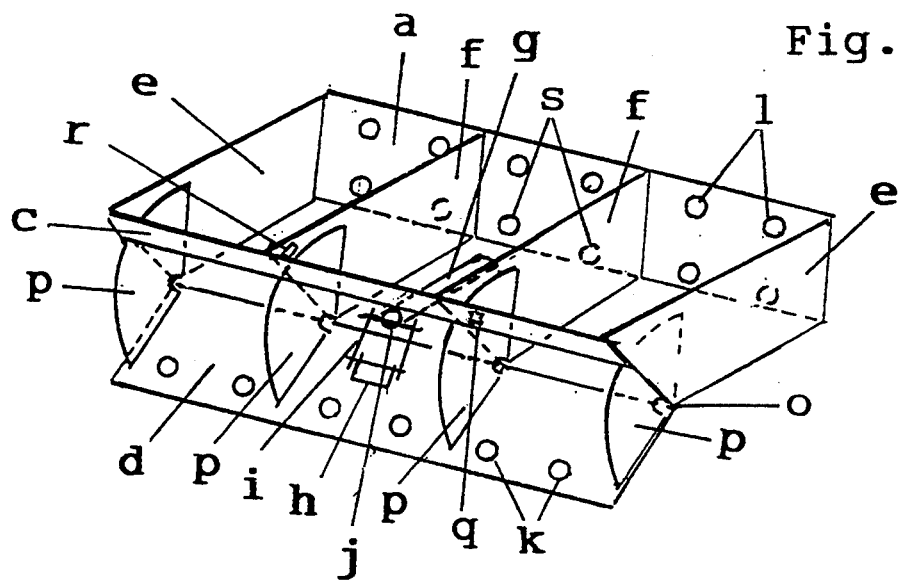
FIG. 1 is a three dimensional view illustrating the open position of the controlled panel and other components of the Air Scoop of the current invention as they would appear relative to the installed position. The top panel was not shown installed to better visualize the other components.
Figure 2:
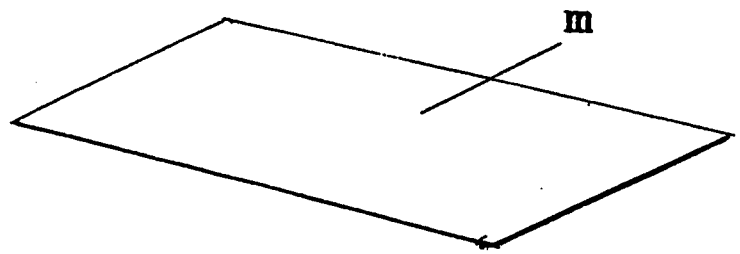
FIG. 2 shows a typical installation of the Air Scoop of the current invention as it would be installed underneath a vehicle.
Figure 2:
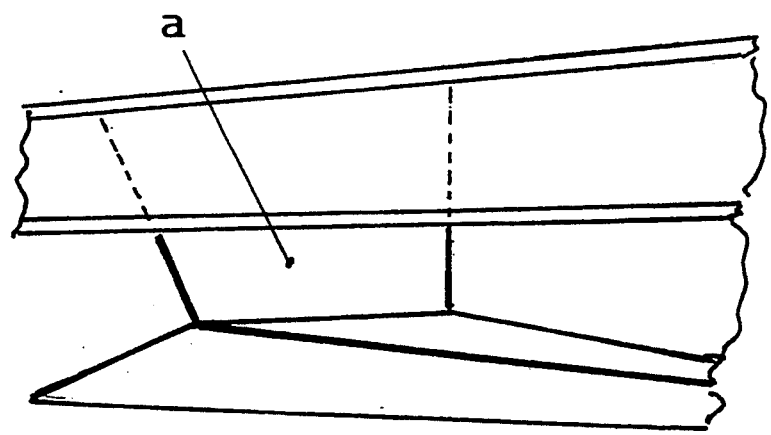
Figure 3:
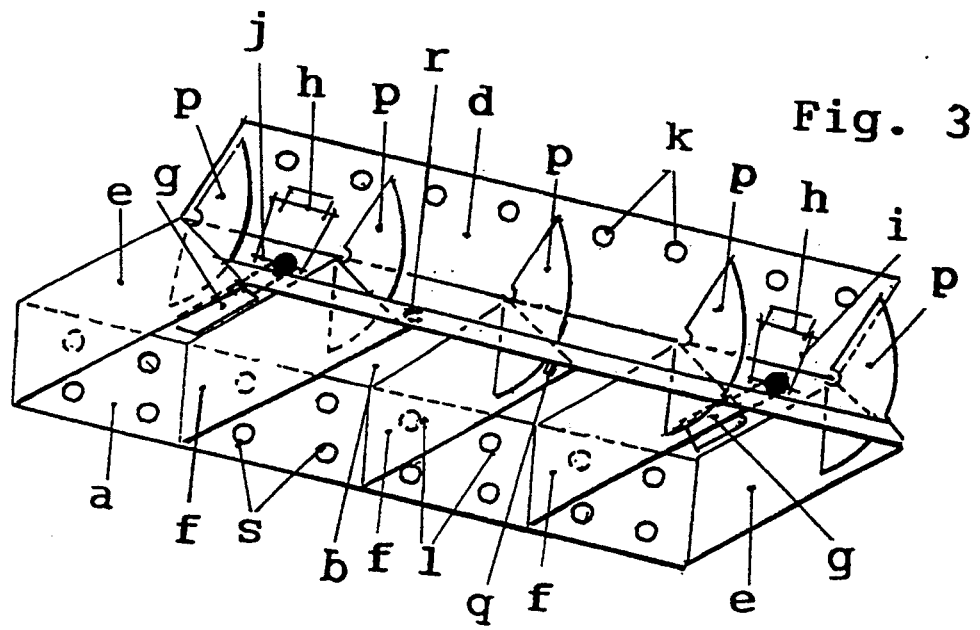
FIG. 3 is a three dimensional view illustrating the open position of the controlled panel and other components of the Air Scoop Of the current invention as they would appear relative to the installed position of FIG. 2, which is the same Air Scoop shown in FIG. 1 except it is in an inverted position. The large panel was not shown installed to better visualize the other components.
Figure 4:
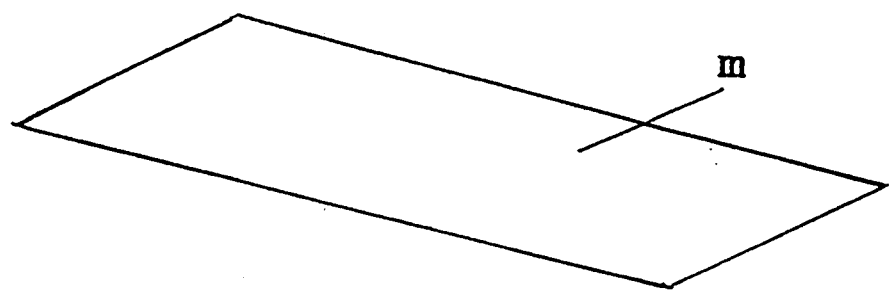
FIG. 4 shows a typical installation of the Air Scoop of the current invention as it would be installed on the roof of a vehicle.
Figure 4:
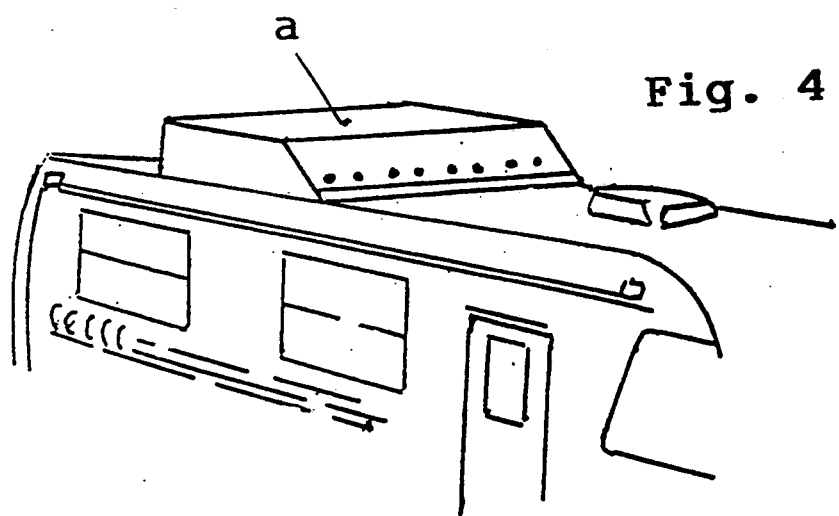

The current invention is directed to an air scoop which is basically a retangular box like structure having the following components: a bottom panel ((b) in FIG. 1 and (m) in FIG. 3); a top panel ((m) in FIG. 1 and (b) in FIG. 3); a pair of side panels (e); a back panel (a); a front controlled panel (d); a front fixed panel (c); stiffener panels (f); and air guide panels (p). All of these components are individual panels which are operatively attached to one another. The front controlled panel and the front fixed panel function to completely close the front wall of the air scoop when the front controlled panel is in the closed position. Also, the front control panel is pivotally attached to the bottom panel (b) in the FIG. 1 arrangement and to the top panel (b) in the FIG. 3 arrangement by a hinge (o). The component which functions to actuate the controlled panel is an actuator (g) as in FIG. 1, or a plurality of actuators (g) as in FIG. 3. Each actuator has the following components: an acuator bar (j); a pair of rods (i); and a controlled panel bar (j). These components function to operatively associate the actuator(s) with the controlled panel. The air scoop also has an upward limit switch (q); and a downward limit switch (r) of conventional construction for limiting the extreme movements of the actuator. The panels are constructed of materials whose strength will withstand vibrations, high pressures, and elements of weather. The panels should be assembled insuring the seams are joined together securely to prevent premature failure and maintain the integrity of the air scoop., There are no fixed dimensions for the elements of the invention because the space available for installation will determine the overall dimentions of the air scoop. There are perorations (1) in the back panel (a) which allow air to escape from the inside of the air scoop. The controlled panel (d) also has perforations (1) therein which helps to stabilize the controlled panel during movement.

In operation, the hinged controlled panel of the air scoop which is attached to a vehicle may be opened by activation of a control unit, operatively associated with the controlled panel actuator(s), located near the driver of the vehicle when braking assistance is desired. The opened panel will allow air to flow into the air scoop which helps to reduce the velocity of the vehicle by increasing the vehicle's aerodynamic drag. The air flow is guided by the air guide panels attached to the controlled panel. This device may also be activated in the event of brake failure in order to somewhat reduce the velocity of the vehicle. The air scoop could also be used in a manner to help reduce normal vehicle brake wear. The air scoop is not intended to be a replacement for the normal brakes of the vehicle.

The foregoing is considered as illustrative only of the principles of the invention. Further, since numerous modifications and changes will readily occur, once the value of utilizing drag is realized, it is not desired to limit the invention to the exact construction, and operation shown and described, and, accordingly, all suitable modifications and equivalents may be resorted to, falling within the scope of the invention.

What is claimed as new is as follows:

1. An air scoop attachable to a vehicle for selectively creating drag on the vehicle as a speed reduction aid, said air scoop comprising:

a generally box like structure having a bottom panel, a top panel, a pair of side panels, and a fixed rear panel attached to each other to form said box like structure and a controlled front panel hingedly attached to either said top panel or to said bottom panel for selective opening and closing of said box like structure, an actuator attached to said controlled front panel for opening and closing said controlled front panel, said fixed back panel having a plurality of perforations therein, wherein said controlled front panel is normally closed to prevent air from the air stream that passes by the vehicle from entering said air scoop and when speed reduction is desired, said actuator is activated to open said controlled front panel and allow air into said air scoop which increases the drag on the vehicle as the air impacts said fixed rear wall, said plurality of perforations in said fixed rear wall allow for some air pressure relief as well as moisture to pass through said air scoop.

2. The air scoop according to claim 1, wherein said controlled front wall is slanted towards the rear of said vehicle when closed to reduce drag while in this position.

3. The air scoop according to claim 1, wherein said air scoop includes a plurality of stiffener panels located inside said box like structure.

4. The air scoop according to claim 1, wherein said controlled front panel includes a plurality of air guide panels thereon.

* * * * *